Jan. 22, 1963
O. J. HOLMES
3,074,323
DEBURRING APPARATUS
Filed April 6, 1960
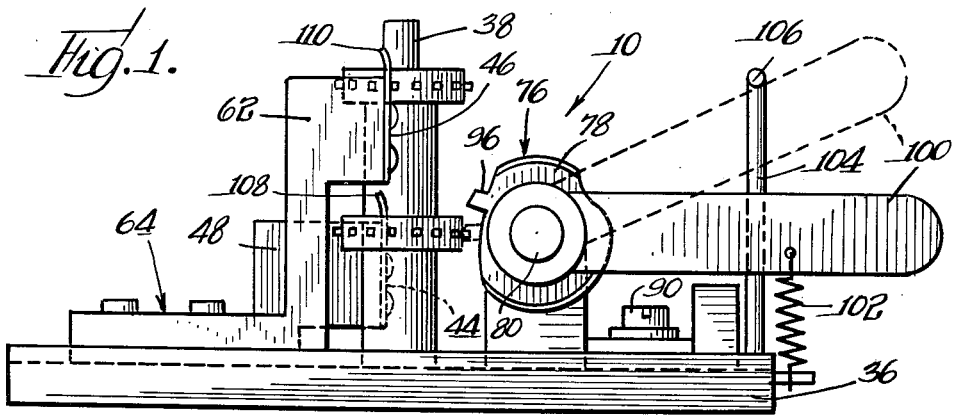
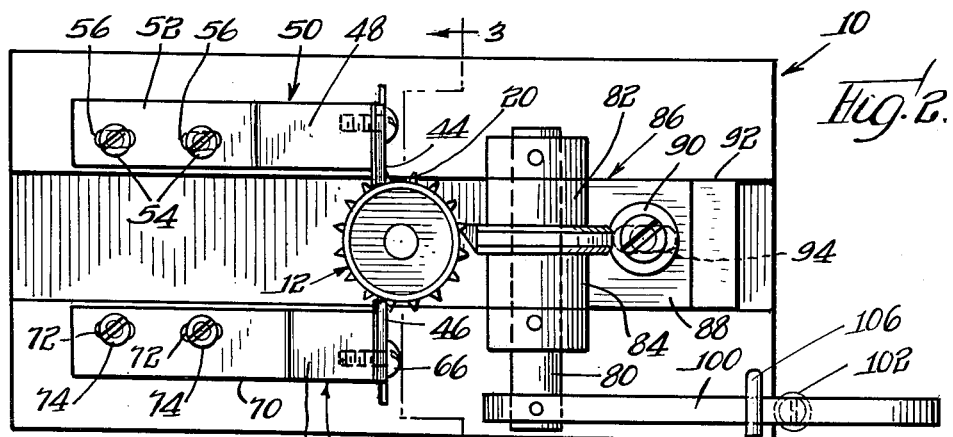
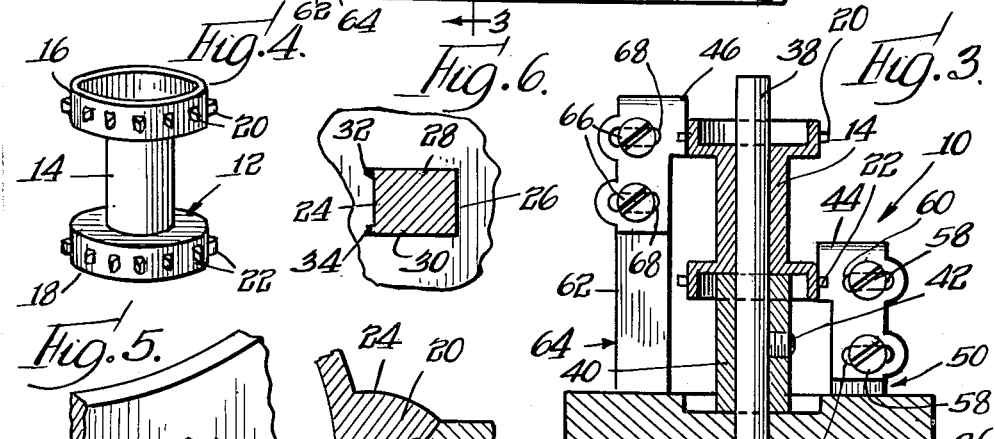
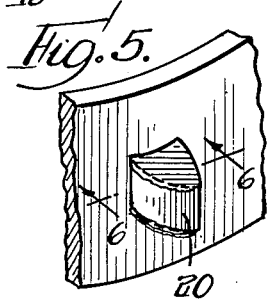
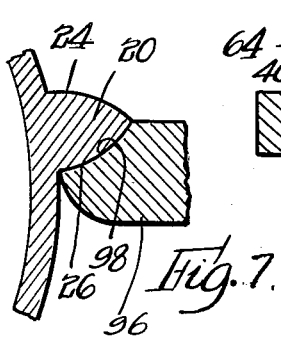
INVENTOR.
Oscar J. Holmes
BY
Olson & Trexler
Attys.

United States Patent Office 3,074,323
Patented Jan. 22, 1963

3,074,323
DEBURRING APPARATUS
Oscar J. Holmes, 512 N. Belden Ave., Chicago, Ill.
Filed Apr. 6, 1960, Ser. No. 20,485
6 Claims. (Cl. 90—1.4)

The present invention relates to a novel apparatus for finishing workpieces, and more particularly to a novel apparatus for finishing teeth of sprockets and the like which may be used in cameras or moving picture projectors for guiding or feeding film.

Sprockets of the type contemplated herein are provided with circumferentially spaced teeth arranged for entering into apertures along one or both margins of a strip of film for guiding or feeding the film. Such teeth are usually formed with curved front and trailing side surfaces and substantially flat opposite end faces. During the formation of such sprocket teeth in accordance with procedures heretofore in general use, burrs or the like are frequently left along the curved front and trailing faces at their junctions with the flat end faces. Such burrs or rough edges may cut the film so that breakage of the film may result.

An important object of the present invention is to provide a novel apparatus whereby burrs and the like may be removed from sprocket teeth of the type contemplated herein quickly and easily.

A further object of the present invention is to provide a novel apparatus for removing burrs and the like from sprocket teeth, which apparatus is of relatively simple and economical construction.

A more specific object of the present invention is to provide a novel apparatus of the above described type which may be readily adjusted and adapted for accommodating sprockets of different sizes.

Further objects and advantages of the present invention will become apparent from the following description and accompanying drawings wherein:

FIG. 1 is a side elevational view showing an apparatus incorporating features of the present invention;

FIG. 2 is a plan view of the apparatus shown in FIG. 1;

FIG. 3 is a partial sectional view taken along line 3—3 in FIG. 2;

FIG. 4 is a perspective view showing a sprocket wheel which is adapted to be processed in the apparatus of the present invention;

FIG. 5 is an enlarged fragmentary perspective view showing a portion of the sprocket wheel and particularly showing burrs and the like which may be left on the unfinished sprocket wheel teeth;

FIG. 6 is a fragmentary sectional view taken along line 6—6 in FIG. 5; and

FIG. 7 is an enlarged fragmentary sectional view showing the manner in which a cutting tool incorporated in the apparatus of the present invention severs the burrs and the like from a sprocket tooth.

Referring now more specifically to the drawings wherein like parts are designated by the same numerals throughout the various figures, an apparatus 10 incorporating features of the present invention is shown in FIGS. 1, 2 and 3. The apparatus is adapted to process a sprocket 12 of the type which may be used in cameras or motion picture projectors for guiding and feeding film. In the embodiment shown, the sprocket 12 is provided with a tubular body portion 14 and enlarged cylindrical end portions 16 and 18 integral with opposite ends of the tubular body portion. Teeth 20 are integrally formed with and spaced circumferentially around the cylindrical or wheel portion 16 and identical teeth 22 are spaced around the cylindrical or wheel portion 18 of the sprocket.

As shown best in FIGS. 5, 6 and 7 each tooth of the sprocket includes opposite curved side surfaces 24 and 26 for facilitating entry of the teeth into and retraction of the teeth from the apertures which are provided along the margins of a film strip in the well known manner. In addition each tooth comprises substantially flat opposite end faces 28 and 30. As shown best in FIGS. 5 and 6, rough edges or burrs 32 and 34 are frequently left at the junction between the end faces 28 and 30 and one of the curved side surfaces during the usual manufacturing procedure heretofore in general use. It will be appreciated that these burrs which are frequently quite sharp may easily cut and injure the film which is being guided or fed by the sprocket.

The apparatus 10 includes a base member or plate 36 which is adapted to rest on any suitable support. A pin 38 is fixed to and extends upwardly from the base member 36, which pin is adapted to receive the tubular body portion 14 of the sprocket. The diameter of the pin is closely similar to but slightly less than the internal diameter of the sprocket so that the sprocket will be accurately and rotatably supported by the pin.

In order to locate and hold a sprocket on the upstanding pin 38 in a predetermined position for processing or deburring in the manner described below, a tubular spacing block 40 is assembled on the pin 38 and rests against the upwardly facing surface of the base plate 36 for supporting the sprocket at the desired elevation above the base plate. The spacing block 40 is removably secured to the pin by means of a setscrew 42 and it is to be understood that the block 40 may be readily replaced by additional blocks, not shown, of varying lengths for adapting the apparatus to accommodate sprockets of varying lengths. In addition, means is provided for engaging the sprocket teeth for holding the sprocket against rotation during the deburring process. This means comprises stop elements 44 and 46 disposed on opposite sides of the pin 38 for engagement with the sprocket teeth. As shown best in FIG. 2, the stop element 44 is adapted to engage one side surface of one sprocket tooth for preventing rotation of the sprocket in a counterclockwise direction and thereby positively locating another tooth for processing or deburring in the manner described below, and a stop element 46 is similarly adapted to engage a sprocket tooth generally opposite from the stop element 44 for holding the sprocket against rotation in a clockwise direction.

The stop element 44 is secured to an upstanding portion 48 of a mounting bracket 50 having a horizontal leg portion 52 secured to the base plate by a plurality of spaced screws 54. Slots 56 are provided in the bracket portion 52 in order to enable the bracket to be adjusted back and forth longitudinally of the base plate in order to position the stop element 44 in accordance with the size of the sprocket to be processed. In addition, the stop element 44 may be mounted for adjustment transversely of the base plate in order to accommodate sprockets of different diameters or sizes, and such adjustable mounting may be accomplished by securing the stop element to the bracket with screws 58 which extend through slots 60 in the stop element and which are elongated transversely of the base member.

The stop element 46 is similarly adjustably mounted. More specifically the stop element 46 is secured to an upstanding portion 62 of a bracket 64 by means of screws 66 threaded into the bracket portion and extending through the elongated slot 68 in the stop element. The bracket 64 includes a horizontal portion 70 having elongated slots 72 therethrough for accommodating screws 74 threaded into suitable apertures provided in the base plate.

As shown in FIGS. 1 and 3, the sprocket accommodating pin 38 extends upwardly above the uppermost ends of the stop elements 44 and 46. This enables the sprocket to be manually raised in order to disengage the teeth from the stop elements without complete disengagement of the sprocket from the pin or shaft 38. This feature facilitates manual rotation or indexing of the sprocket after each deburring operation. Preferably the stop elements 44 and 46 are arranged at different elevations, as shown in FIGS. 1 and 3 so that one stop element engages teeth at the lower margin of the sprocket while the other stop element engages the teeth around the upper margin of the sprocket. With this arrangement it is only necessary to raise the sprocket sufficiently to disengage the upper and lower teeth from the upper and lower stop elements in order to permit indexing of the sprocket, or in other words, the lower end of the sprocket need not be raised above the upper stop element.

In order to accomplish the deburring operation, a cutting tool 76 is provided, which tool has a body portion 78 fixed to and pivotally supported by a shaft 80. The shaft 80 is in turn rotatably supported by upstanding legs 82 and 84 which embrace the tool body and which form a part of a support bracket 86 having a horizontal portion 88 secured to the base plate by means of a screw 90. In order to position accurately the supporting bracket 86 and thus the cutting tool, the base plate is formed with a longitudinally extending groove 92 which closely and slidably receives the horizontal portion 88 of the support bracket. In addition, the horizontal portion 88 of the bracket is provided with an elongated slot 94 through which the screw 90 extends so that the tool may be adjusted toward and away from the sprocket supporting shaft or pin 38 in order to accommodate sprockets of different sizes.

The tool 76 includes a tip portion 96 extending radially outwardly from the body portion 78. As shown best in FIG. 7, the portion 96 is provided with a front face and cutting edge 98 having a curved configuration conforming substantially exactly to the configuration of the curved sides of the sprocket teeth. It will be noted that the axis of rotation of the cutting tool is positioned with respect to the height of the spacing block 40 so that the axis is disposed in a plane substantially bisecting the teeth to be processed by deburring. Thus, then the cutting tool is rotated from the solid line position shown in FIG. 1 to the broken line position, the cutting edge 98 will pass closely along a curved side surface of one of the sprocket teeth and effectively remove any burrs therefrom. Of course, the sprocket tooth being processed is positively held in position for proper association with the cutting tool by the stop elements 44 and 46.

In order to actuate or rotate the tool 76, a handle member 100 which may be manipulated by hand is fixed to the shaft 80. Preferably a spring 102 is connected between the handle member and the base plate in the manner shown for normally biasing the handle member to a retracted solid line position shown in FIG. 1, in which the tip portion 96 of the cutting tool is rotated or retracted to a point at which it will not interfere with the sprocket during indexing of the sprocket or assembly of the sprocket on or removal of the sprocket from the pin 38. It will be appreciated that the cutting tool may be easily operated merely by pulling up on the handle 100 to shift the handle to the broken line position shown in FIG. 1. Preferably means is provided for limiting the upward movement of the handle. In the embodiment shown this means comprises a member 104 secured to and extending upwardly from the base plate and having a laterally projecting hook portion 106 at its upper end for engagement with the handle member.

A brief résumé of the manner in which a sprocket may be processed in accordance with the present invention is as follows:

The sprocket is, of course, applied to the upper end of the pin 38 and then slipped downwardly until the teeth thereof are engaged by the stop elements 44 and 46. It will be noted, as shown best in FIG. 1, that the upper end portions 108 and 110 of the stop elements are deflected rearwardly so as to facilitate initial engagement of the stop elements with the sprocket teeth. When the sprocket is properly positioned against the top of the spacing block 40 and is locked against rotation by the stop elements 44 and 46, the handle 100 is pulled upwardly for actuating the cutting tool to remove the burrs from an adjacent sprocket tooth. Then the handle is released to enable the spring 102 to retract the cutting tool and the sprocket is manually raised sufficiently to disengage the teeth from the stop elements 44 and 46 and then rotated the desired amount whereupon it is lowered for re-engagement with the stop elements 44 and 46. This sequence of steps is, of course, repeated until the burrs have been removed from all of the teeth.

While the preferred embodiment of the present invention has been shown and described herein, it is obvious that many structural details may be changed without departing from the spirit and scope of the appended claims.

The invention is claimed as follows:

1. An apparatus for removing burrs and the like from edges of teeth of film accommodating sprockets of the type described comprising a base, means on said base for supporting a sprocket on a predetermined axis and with teeth thereof to be processed substantially bisected by a predetermined plane disposed perpendicularly with respect to said axis, stop means on said base for engaging one side of a sprocket tooth for positively preventing movement of the sprocket in one direction and thereby positively locating a second tooth of the sprocket in a predetermined position, a tool support mounted on said base, means adjustably mounting said stop means for adjustment longitudinally and transversely of said base for enabling the stop means to be positioned for accommodating sprockets of different sizes, a tool member mounted on said tool support for pivotal movement about a second axis substantially disposed in said plane, said tool member including cutting edge means facing circumferentially of said sprocket in a direction substantially opposite to said stop means for engaging and cutting any burr and the like from a side of said second tooth located in said predetermined position, and means operatively connected with said tool member for actuating said tool member.

2. An apparatus, as defined in claim 1, which includes additional stop means mounted on said base and spaced from said first mentioned stop means for engaging another tooth of a sprocket for combining with said first stop means for preventing rotation of the sprocket in either direction, and means adjustably mounting said additional stop means for adjustment longitudinally and transversely of said base.

3. An apparatus for removing burrs and the like from edges of teeth of film accommodating sprockets of the type described comprising a base, upstanding pin means on said base for rotatably supporting a sprocket on a predetermined axis, a stop element mounted on said base for engaging one side of a sprocket tooth for positively limiting rotation of the sprocket in one direction and thereby positively locating a second tooth of the sprocket in a predetermined position, means adjustably mounting said stop element for adjustment longitudinally and transversely of said base for enabling the stop element to be positioned for accommodating sprockets of different sizes, spacer block means replaceably disposed on said base in association with said pin means for engaging and locating a sprocket with teeth of the sprocket to be processed substantially bisected by a predetermined plane arranged perpendicularly with respect to said axis, a tool support mounted on said base, a tool member mounted on said tool support for pivotal movement about a second axis disposed substantially perpendicularly with respect to said first mentioned axis, said tool member including cutting edge means facing circumferentially of said sprocket oppositely with respect to said stop means for engaging and cutting any burr and the like from a side of said second tooth located in said predetermined position, and means operatively connected with said tool member for actuating said tool member.

4. An apparatus, as defined in claim 3, which includes means adjustably securing said tool support for movement toward and away from said pin means for adapting the apparatus for accommodating sprockets of different sizes.

5. An apparatus for removing burrs and the like from edges of teeth of film accommodating sprockets of the type described comprising a base, upstanding pin means on said base for rotatably supporting a sprocket on a predetermined axis, a stop element mounted on said base for engaging one side of a sprocket tooth for positively limiting rotation of the sprocket in one direction and thereby positively locating a second tooth of the sprocket in a predetermined position, spacer block means replaceably disposed on said base in association with said pin means for engaging and locating a sprocket with teeth of the sprocket to be processed substantially bisected by a predetermined plane arranged perpendicularly with respect to said axis, a tool support mounted on said base, a tool member mounted on said tool support for pivotal movement about a second axis disposed substantially perpendicularly with respect to said first mentioned axis, said tool member including cutting edge means facing circumferentially of said sprocket oppositely with respect to said stop means for engaging and cutting any burr and the like from a side of said second tooth located in said predetermined position, means operatively connected with said tool member for actuating said tool member, said means for actuating said tool member comprising a handle manually operable from a retracted to an extended position, and spring means connected between said handle and said base for normally biasing the handle to said retracted position.

6. An apparatus for removing burrs and the like from edges of teeth of film accommodating sprockets of the type described comprising a base, upstanding pin means on said base for rotatably supporting a sprocket on a predetermined axis, a stop element mounted on said base for engaging one side of a sprocket tooth for positively limiting rotation of the sprocket in one direction and thereby positively locating a second tooth of the sprocket in a predetermined position, spacer block means replaceably disposed on said base in association with said pin means for engaging and locating a sprocket with teeth of the sprocket to be processed substantially bisected by a predetermined plane arranged perpendicularly with respect to said axis, a tool support mounted on said base, a tool member mounted on said tool support for pivotal movement about a second axis disposed substantially perpendicularly with respect to said first mentioned axis, said tool member including cutting edge means facing circumferentially of said sprocket oppositely with respect to said stop means for engaging and cutting any burr and the like from a side of said second tooth located in said predetermined position, means operatively connected with said tool member for actuating said tool member, and a second stop element mounted on said base and spaced from said first mentioned stop element for engaging another tooth of the sprocket for combining with said first mentioned stop element for preventing rotation of the sprocket in opposite directions, said stop elements having upper terminal edges spaced from each other axially of said pin means for adapting said stop elements respectively for engagement with teeth around opposite end margins of a sprocket.

References Cited in the file of this patent
UNITED STATES PATENTS

| | | |
|---|---|---|
| 1,749,580 | Hamilton | Mar. 4, 1930 |
| 2,372,815 | Denton | Apr. 3, 1945 |
| 2,865,257 | Christman et al. | Dec. 23, 1958 |